(12) United States Patent
Belshan et al.

(10) Patent No.: US 12,359,663 B2
(45) Date of Patent: Jul. 15, 2025

(54) VALVE CARTRIDGE FOR A FLUID PUMP

(71) Applicant: SPM Oil & Gas Inc., Fort Worth, TX (US)

(72) Inventors: Daryl James Belshan, Weatherford, TX (US); David T. Figgs, Fort Worth, TX (US); Justin Poehls, Glen Rose, TX (US); Abraham Canales, Crowley, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 45 days.

(21) Appl. No.: 18/457,172

(22) Filed: Aug. 28, 2023

(65) Prior Publication Data

US 2025/0075694 A1 Mar. 6, 2025

(51) Int. Cl.
*F04B 53/10* (2006.01)
*F16K 15/06* (2006.01)

(52) U.S. Cl.
CPC ........ *F04B 53/1032* (2013.01); *F04B 53/102* (2013.01); *F04B 53/1022* (2013.01); *F04B 53/1025* (2013.01); *F04B 53/1027* (2013.01); *F04B 53/103* (2013.01); *F16K 15/063* (2013.01); *F16K 15/066* (2013.01); *F16K 2200/501* (2021.08); *F16K 2200/502* (2021.08)

(58) Field of Classification Search
CPC .......................... F04B 53/1032; F04B 53/103; F04B 53/1035; F04B 53/1022; F04B 53/1025; F04B 53/1027; F04B 53/102; F16K 15/063; F16K 15/066; F16K 2200/501; F16K 2200/502
See application file for complete search history.

(56) References Cited

U.S. PATENT DOCUMENTS

| | | | |
|---|---|---|---|
| 1,632,155 A * | 6/1927 | Vollmann | F16K 15/035 137/857 |
| 7,341,435 B2 | 3/2008 | Mcars | |
| 10,151,414 B2 | 12/2018 | Micken et al. | |
| 10,184,470 B2 | 1/2019 | Barnett, Jr. | |
| 10,247,182 B2 | 4/2019 | Zhang et al. | |
| 11,293,227 B2 | 4/2022 | Brunet | |
| 2014/0086774 A1 * | 3/2014 | Chandrasekaran | F04B 39/125 137/543.13 |
| 2020/0011317 A1 | 1/2020 | Haas | |
| 2022/0099073 A1 | 3/2022 | Thomas et al. | |
| 2022/0282717 A1 | 9/2022 | Thomas et al. | |
| 2022/0282720 A1 | 9/2022 | Foster et al. | |
| 2022/0381234 A1 | 12/2022 | Son et al. | |

(Continued)

FOREIGN PATENT DOCUMENTS

| | | | | |
|---|---|---|---|---|
| CN | 106481528 A | | 3/2017 | |
| CN | 108894979 A | * | 11/2018 | ............ F04B 53/109 |

(Continued)

*Primary Examiner* — Atif H Chaudry
(74) *Attorney, Agent, or Firm* — Foley & Lardner LLP (57) ABSTRACT

A fluid pump may include a power end, a fluid end having a cartridge bore, and a valve cartridge configured for insertion into, and removal from, the cartridge bore as a unit. The valve cartridge may include a cartridge body having a fluid inlet and a fluid outlet, a first valve assembly configured to control fluid flow through the fluid inlet, and a second valve assembly configured to control fluid flow through the fluid outlet.

20 Claims, 8 Drawing Sheets

(56) References Cited

U.S. PATENT DOCUMENTS

| | | |
|---|---|---|
| 2022/0397107 A1 | 12/2022 | Thomas et al. |
| 2023/0193887 A1 | 6/2023 | Thomas et al. |
| 2023/0272786 A1 | 8/2023 | Thomas et al. |
| 2024/0175430 A1 | 5/2024 | Thomas et al. |
| 2024/0318643 A1 | 9/2024 | Thomas et al. |

FOREIGN PATENT DOCUMENTS

| | | | |
|---|---|---|---|
| CN | 214403951 U | 10/2021 | |
| WO | WO-2023145367 A1 * | 8/2023 | .............. F04B 43/02 |

* cited by examiner

VALVE CARTRIDGE FOR A FLUID PUMP

TECHNICAL FIELD

The present disclosure relates generally to fluid pumps and, for example, to a valve cartridge for a fluid pump.

BACKGROUND

Hydraulic fracturing is a well stimulation technique that typically involves pumping hydraulic fracturing fluid into a wellbore at a rate and a pressure (e.g., up to 15,000 pounds per square inch (psi)) sufficient to form fractures in a rock formation surrounding the wellbore. This well stimulation technique often enhances the natural fracturing of a rock formation to increase the permeability of the rock formation, thereby improving recovery of water, oil, natural gas, and/or other fluids.

A hydraulic fracturing system may employ one or more fluid pumps for pressurizing hydraulic fracturing fluid. A fluid pump has a suction side, at which low-pressure fluid enters the fluid pump via a suction valve assembly to be pressurized, and a discharge side at which high-pressure fluid pressurized by the fluid pump exits the fluid pump via a discharge valve assembly. A valve assembly may include various components, such as a valve, a valve seat, a spring, a spring retainer, or the like. Each of these components is subject to wear and/or failure, and therefore may be serviced (e.g., reconditioned, repaired, or replaced) from time to time (e.g., about every 100 hours). For example, to service the suction and discharge valve assemblies of the fluid pump, the suction and discharge valve assemblies may be disassembled and removed from the fluid pump, sometimes using specialized equipment, and then reassembled in the fluid pump following servicing. Accordingly, servicing the suction and discharge valve assemblies of the fluid pump is time consuming and inefficient.

The valve cartridge of the present disclosure solves one or more of the problems set forth above and/or other problems in the art.

SUMMARY

A valve cartridge for a fluid pump may include a cartridge body defining a first end and a second end opposite the first end. The cartridge body may have a fluid inlet and a fluid outlet. The valve cartridge may include a first valve assembly configured to control fluid flow through the fluid inlet. The first valve assembly may be disposed inside the cartridge body. The valve cartridge may include a second valve assembly configured to control fluid flow through the fluid outlet. At least a portion of the second valve assembly may extend outside the cartridge body. The valve cartridge may be configured for insertion into, and removal from, a cartridge bore in a housing of the fluid pump as a unit.

A valve cartridge for a fluid pump may include a cartridge body having a fluid inlet and a fluid outlet. The valve cartridge may include a first valve assembly configured to control fluid flow through the fluid inlet. The valve cartridge may include a second valve assembly configured to control fluid flow through the fluid outlet. The valve cartridge may be configured for insertion into, and removal from, a cartridge bore in a housing of the fluid pump as a unit.

A fluid pump may include a power end, a fluid end having a cartridge bore, and a valve cartridge configured for insertion into, and removal from, the cartridge bore as a unit. The valve cartridge may include a cartridge body having a fluid inlet and a fluid outlet, a first valve assembly configured to control fluid flow through the fluid inlet, and a second valve assembly configured to control fluid flow through the fluid outlet.

DETAILED DESCRIPTION

This disclosure relates to a valve cartridge, which is applicable to any positive displacement fluid pump.

Figure 1:
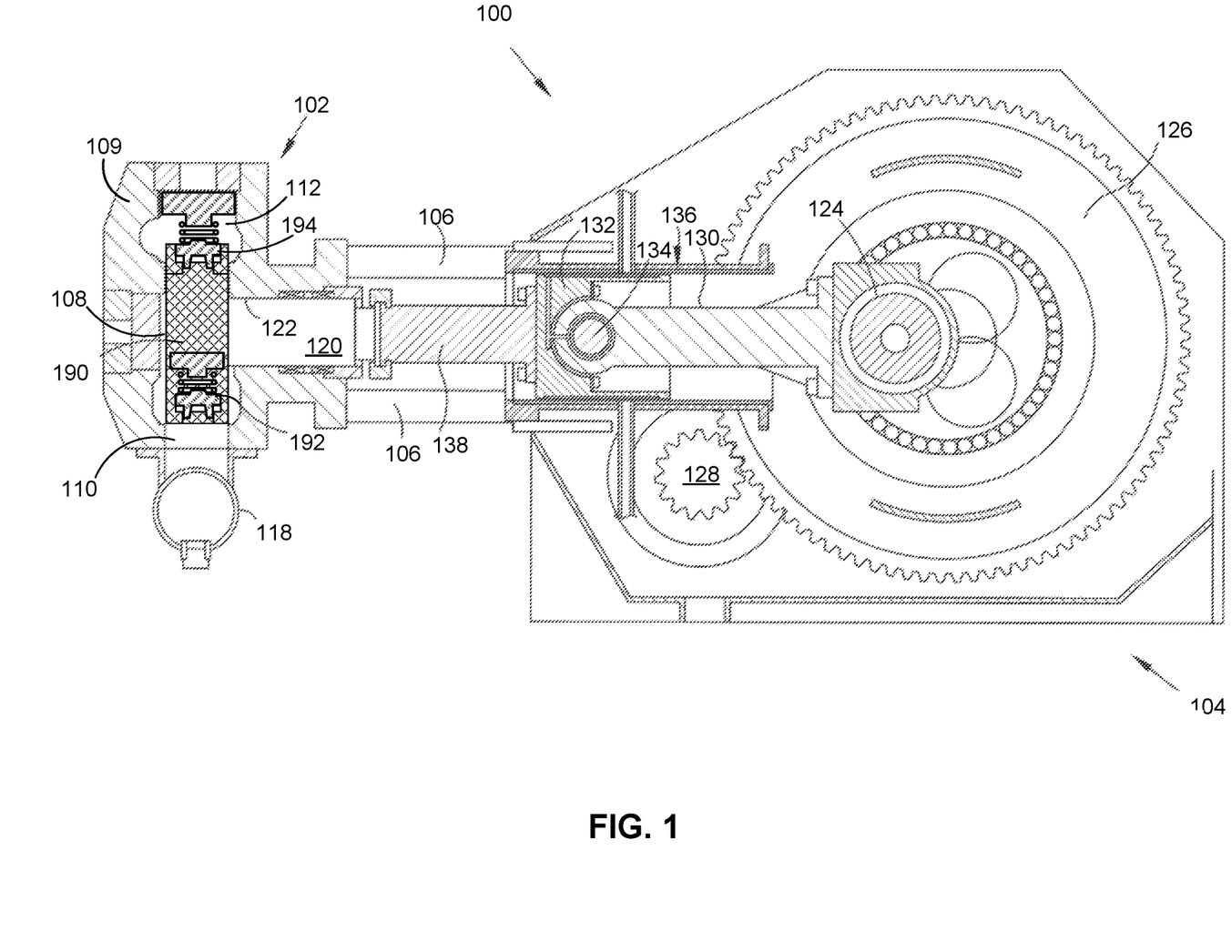
FIG. 1 is a sectional view of an example fluid pump.

FIG. 1 is a sectional view of an example fluid pump 100. The fluid pump 100 includes a fluid end 102 and a power end 104. The fluid end 102 may be connected to the power end 104 by stay rods 106. The fluid end 102 includes one or more bores 108 (only one shown) defined in a housing 109 of the fluid end 102. For example, the fluid pump 100 may include one, two, three, four, five, or more bores 108. In some implementations, the fluid pump 100 may be mounted on a trailer to facilitate transportation of the fluid pump 100 between operational sites. In some implementations, the fluid pump 100 may be a hydraulic fracturing pump. For example, the fluid pump 100 may have a capability to produce a discharge pressure of at least 8,000 psi, at least 10,000 psi, at least 12,000 psi, or at least 15,000 psi.

The bore 108 is a passageway through the housing 109 of the fluid end 102. For example, the bore 108 defines a fluid inlet 110 (also referred to as a "suction inlet") and a fluid outlet 112 (also referred to as a "discharge outlet"). The fluid end 102 may include a valve cartridge 190 disposed in the bore 108 (e.g., a respective valve cartridge 190 may be disposed in each bore 108 of the fluid end 102). For example, the valve cartridge 190 is configured for insertion into, and removal from, the bore 108 as a unit. The valve cartridge 190 includes a first valve assembly 192 (referred to herein as a "suction valve assembly") and a second valve assembly 194 (referred to herein as a "discharge valve assembly"). When the valve cartridge 190 is disposed in the bore 108, the suction valve assembly 192 and the discharge valve assembly 194 fluidly separate the fluid inlet 110 from the fluid outlet 112, thereby defining a fluid chamber (or "pressure chamber") in the bore 108 between the suction valve assembly 192 and the discharge valve assembly 194.

In operation, fluid is pressurized to a low pressure (e.g., 80 psi) by an outside system (e.g., a centrifugal pump) and pushed through a suction manifold 118 through the fluid inlet 110 and the suction valve assembly 192 and into the fluid chamber of the bore 108. The fluid is then pumped in response to a forward stroke of a plunger 120 and flows through the discharge valve assembly 194 into the fluid outlet 112. The fluid outlet 112 may be fluidly coupled to a wellbore to supply high pressure fluid to the wellbore for fracturing rock formations and other uses.

In operation, the plunger 120 moves in a plunger bore 122 and is driven by the power end 104 of the fluid pump 100. The power end 104 includes a crankshaft 124 that is rotated by a gearbox output 126, which is illustrated by a single gear but may be more than one gear. A gearbox input 128 is coupled to a transmission (not shown) and a power source (not shown), such as a diesel engine, to rotate the gearbox input 128 during operation. A connecting rod 130 mechanically connects the crankshaft 124 to a crosshead 132 via a wrist pin 134. The crosshead 132 is mounted within a stationary crosshead housing 136, which constrains the crosshead 132 to linear reciprocating movement. A pony rod 138 connects to the crosshead 132 and has its opposite end connected to the plunger 120 to enable reciprocating movement of the plunger 120.

The plunger 120 extends through the plunger bore 122 so as to interface with the fluid chamber of the bore 108. In operation, movement of the crankshaft 124 causes the plunger 120 to reciprocate with respect to the bore 108 (e.g., to reciprocate within, or move linearly toward and away from, the fluid chamber of the bore 108). As the plunger 120 translates away from the bore 108 (a suction stroke of the plunger 120), the pressure of the fluid inside the fluid chamber of the bore 108 decreases, which creates a pressure differential across the suction valve assembly 192. The pressure differential across the suction valve assembly 192 enables actuation of a valve of the suction valve assembly 192 to allow the fluid to enter the fluid chamber of the bore 108 from the suction manifold 118 (e.g., the valve may open responsive to the pressure differential). The pumped fluid is pushed into the fluid chamber of the bore 108 as the plunger 120 continues to translate away from the bore 108. As the plunger 120 changes directions and moves toward the bore 108 (a discharge stroke of the plunger 120), the fluid pressure inside the fluid chamber of the bore 108 increases, which creates a pressure differential across the discharge valve assembly 194. Fluid pressure inside the fluid chamber of the bore 108 continues to increase as the plunger 120 approaches the bore 108 until the pressure differential across the discharge valve assembly 194 is great enough to actuate a valve of the discharge valve assembly 194 and enable the fluid to exit the fluid chamber of the bore 108 (e.g., the valve may open responsive to the pressure differential).

As indicated above, FIG. 1 is provided as an example. Other examples may differ from what is described with regard to FIG. 1.

Figure 2:
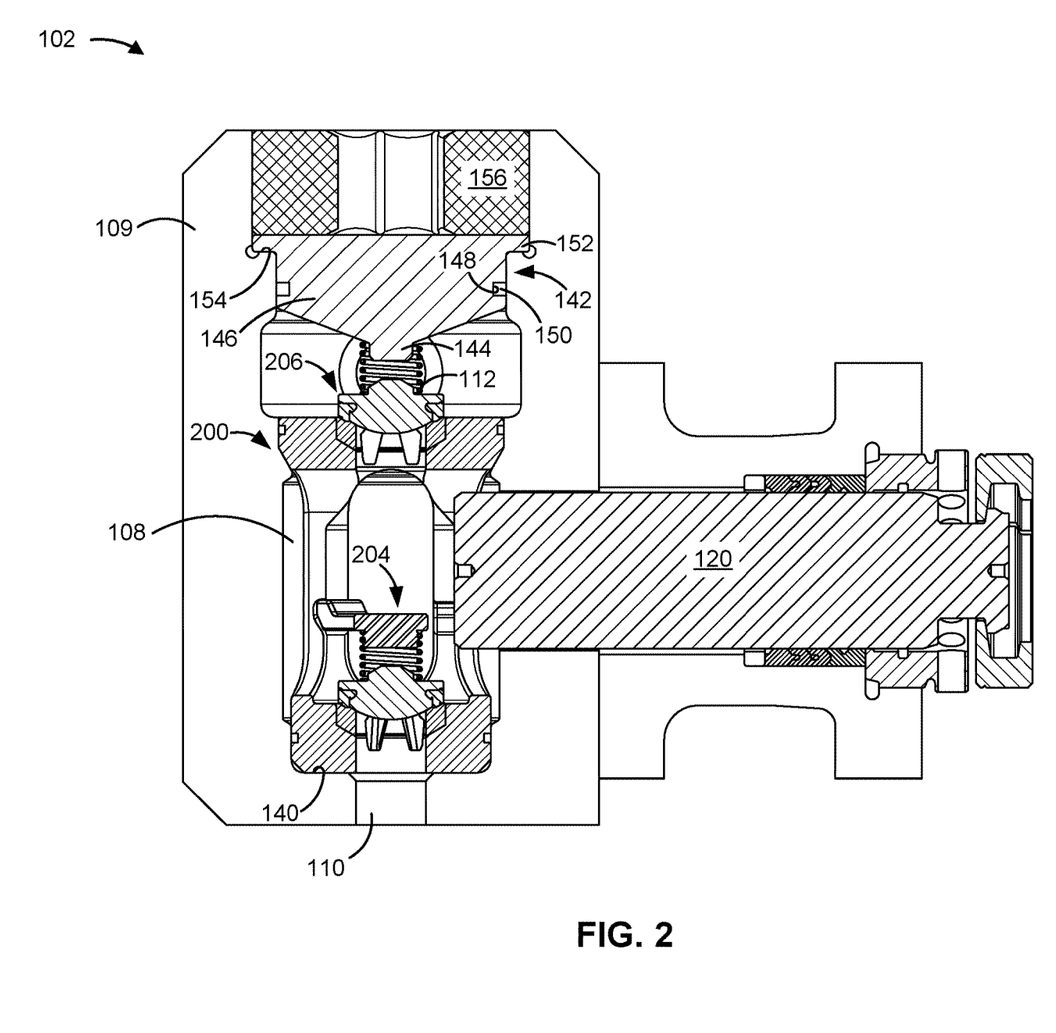
FIG. 2 is a sectional view of an example of a fluid end of the fluid pump of FIG. 1.

FIG. 2 is a sectional view of an example of the fluid end 102 of the fluid pump 100. The example fluid end 102 of FIG. 2 may include a valve cartridge 200 that is removably disposed in the bore 108. The valve cartridge 200 may correspond to the valve cartridge 190, described herein. For example, a suction valve assembly 204 and a discharge valve assembly 206 of the valve cartridge 200 may correspond to the suction valve assembly 192 and the discharge valve assembly 194, respectively, of the valve cartridge 190, described herein.

The bore 108 may have multiple sections of different widths, as shown. As an example, a widest section of the bore 108 may be nearer to a second end of the bore 108 (e.g., associated with the fluid outlet 112) than to a first end of the bore 108 (e.g., associated with the fluid inlet 110). In some examples, a section of the bore 108 in which the valve cartridge 200 is received may be wider than the section of the bore 108 associated with the fluid inlet 110, thereby defining a floor 140 of the housing 109 that provides a stop when the valve cartridge 200 is inserted into the bore 108. In another example, a section of bore 108 may contain a tapered surface, corresponding to a tapered surface of the valve cartridge 200, that provides a stop when the valve cartridge 200 is inserted into the bore 108. For example, the section of the bore 108 in which the valve cartridge 200 is received may have a minimum width that is greater than or equal to a minimum width of the valve cartridge 200 and a maximum width that is greater than or equal to a maximum width of the valve cartridge 200, while the section of the bore 108 associated with the fluid inlet 110 may have a maximum width that is less than the minimum width of the valve cartridge 200. In this way, the configuration of the bore 108 allows the valve cartridge 200 to be inserted into the bore 108, or removed from the bore 108, only from the second end of the bore 108 (e.g., thereby forcing proper orientation of the valve cartridge 200 in the bore 108).

The fluid end 102 may include a retainer element 142 (e.g., a spring retainer) having a retention projection 144 that is configured to engage with a biasing element (described in connection with FIG. 4) of the discharge valve assembly 206. The retention projection 144 may project from a body portion 146 of the retainer element 142. The retainer element 142 may provide retention and opposition to the biasing element of the discharge valve assembly 206. The body portion 146 of the retainer element 142 may have a groove 148 extending circumferentially around the body portion 146. A sealing element 150 (e.g., an elastomeric gasket) may be disposed in the groove 148 to promote a fluid-tight seal of the bore 108.

The retainer element 142 may include a flange 152 that extends circumferentially around (e.g., continuously, or with one or more discontinuities) the body portion 146. The flange 152 may engage with a ledge 154 of the housing 109 that projects into the bore 108 (e.g., a section of the bore 108 may narrow in width to define the ledge 154). Engagement of the flange 152 with the ledge 154 opposes movement of the retainer element 142 towards the valve cartridge 200. Moreover, the fluid end 102 may include a cap 156 disposed in the bore 108. The cap 156 may engage an end of the retainer element 142 that is opposite an end of the retainer element 142 engaged with the discharge valve assembly 206 (e.g., the retainer element 142 is between the cap 156 and the discharge valve assembly 206). The cap 156 may be secured to the fluid end 102 (e.g., via a threaded connection between the cap 156 and the housing 109). Accordingly, the cap 156 opposes movement of the retainer element 142 away from the valve cartridge 200, thereby securing the retainer element 142 in place.

The cap 156 and the retainer element 142 may be removed from the bore 108 (e.g., via the second end of the bore 108) to provide access to the valve cartridge 200. Thus, with the cap 156 and the retainer element 142 removed from the bore 108, the valve cartridge 200 may be removed from the fluid end 102, as a unit (e.g., components of the suction valve assembly 204 and of the discharge valve assembly 206 are removed together as a unit), to facilitate repair or replacement of the valve cartridge 200. Similarly, a replacement, or a repaired, valve cartridge 200 may be inserted into the bore 108 and the retainer element 142 and the cap 156 may be replaced back into the bore 108 to secure the valve cartridge 200.

As indicated above, FIG. 2 is provided as an example. Other examples may differ from what is described with regard to FIG. 2.

Figure 3:
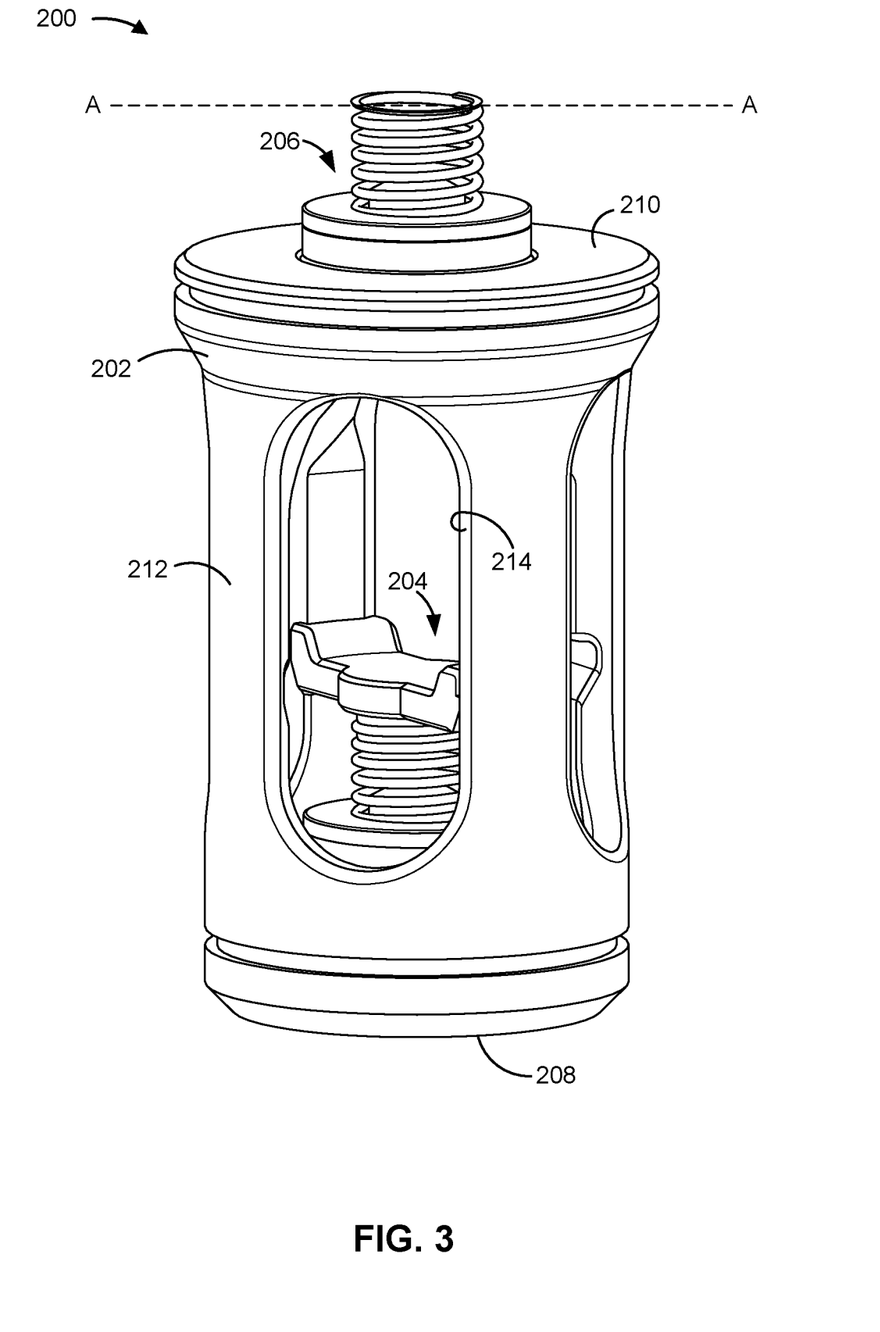
FIG. 3 is a perspective view of an example valve cartridge.

FIG. 3 is a perspective view of an example valve cartridge 200. The valve cartridge 200 includes a cartridge body 202 to which the suction valve assembly 204 and the discharge valve assembly 206 are attached. The cartridge body 202 may be generally cylindrical (e.g., the cartridge body 202 may be configured as a cannister). The cartridge body 202 may be composed of a rigid material, such as a metal (e.g., steel or a steel alloy). The cartridge body 202 defines a first end 208 (referred to herein as a "suction end"), a second end 210 (referred to herein as a "discharge end") opposite the suction end 208, and a sidewall 212 extending between the suction end 208 and the discharge end 210. The sidewall 212 defines a chamber inside the cartridge body 202 between the suction end 208 and the discharge end 210. The cartridge body 202 may have a widest section nearer to the discharge end 210 than to the suction end 208, so as to correspond to the width variations of the bore 108. For example, the cartridge body 202 may narrow in width (e.g., progressively or in one or more steps) from the discharge end 210 to the suction end 208. In this way, the configuration of the cartridge body 202 forces a proper orientation of the valve cartridge 200 when inserted in the bore 108.

The cartridge body 202 may have one or more openings 214 through the sidewall 212. The one or more openings 214 are configured to fluidly couple the valve cartridge 200 with the plunger 120 (e.g., the opening(s) 214 fluidly couple the fluid chamber of the bore 108 with the suction valve assembly 204 and the discharge valve assembly 206). In one example, the cartridge body 202 may have a plurality of openings 214 through the sidewall 212 that define a plurality of pillars in the sidewall 212 (e.g., the sidewall 212 may be composed of the pillars that are between openings 214 through the sidewall 212). The openings 214 provide fluid communication between the chamber inside the cartridge body 202 and an external environment of the cartridge body 202 that is inside of the bore 108. In this way, the openings 214 promote fluid flow (e.g., inside the bore 108) from the suction valve assembly 204 to the discharge valve assembly 206.

The openings 214 may be evenly spaced around the sidewall 212. In one example, the cartridge body 202 may have four openings 214 including a first set of two opposing openings 214 and a second set of two opposing openings 214. An opening 214 may extend longitudinally between the suction end 208 and the discharge end 210 (e.g., the opening 214 may have an oval shape), or may have another configuration that promotes fluid flow.

As indicated above, FIG. 3 is provided as an example. Other examples may differ from what is described with regard to FIG. 3.

Figure 4:
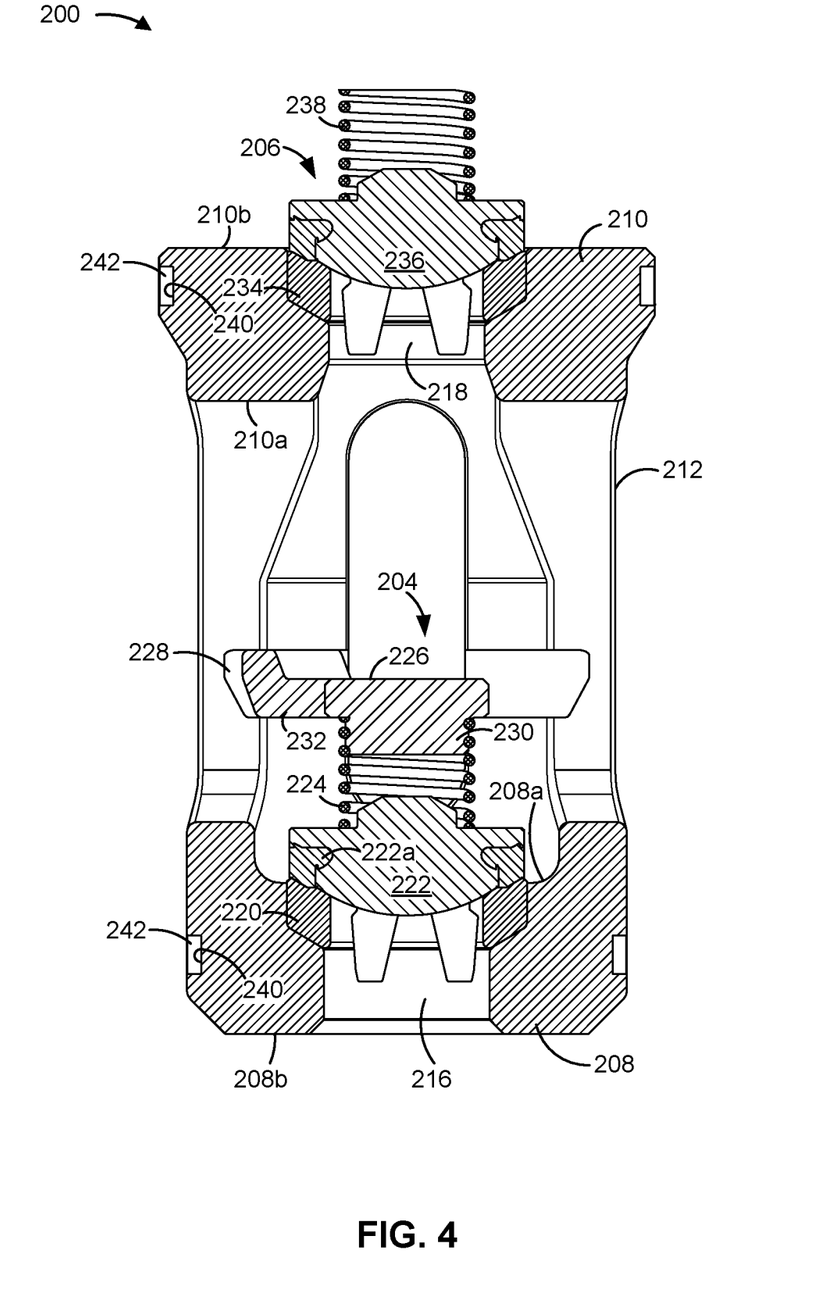
FIG. 4 is a cross-sectional view of the valve cartridge of FIG. 3 taken along line A-A.

FIG. 4 is a cross-sectional view of the valve cartridge 200 of FIG. 3 taken along line A-A. The suction end 208 of the cartridge body 202 has an inner surface 208a, an outer surface 208b, and a fluid inlet 216 (e.g., a bore) extending through the suction end 208 from the inner surface 208a to the outer surface 208b. When the valve cartridge 200 is installed in the bore 108, the fluid inlet 216 may be in fluid communication with the fluid inlet 110 (e.g., the fluid inlet 216 may align with the fluid inlet 110). Similarly, the discharge end 210 of the cartridge body 202 has an inner surface 210a, an outer surface 210b, and a fluid outlet 218 (e.g., a bore) extending through the discharge end 210 from the inner surface 210a to the outer surface 210b. When the valve cartridge 200 is installed in the bore 108, the fluid outlet 218 may be in fluid communication with the fluid outlet 112 (e.g., via void space in the bore 108).

The suction valve assembly 204 of the valve cartridge 200 may include a valve seat insert 220, a valve 222, a biasing element 224, and a retainer element 226. The suction valve assembly 204 may be disposed inside the cartridge body 202 (e.g., the suction valve assembly may be entirely within the cartridge body 202). The suction valve assembly 204 may interface with the fluid inlet 216 at the inner surface 208a of the suction end 208. Thus, the suction valve assembly 204 may be configured to control fluid flow through the fluid inlet 216.

The valve seat insert 220 is the component of the suction valve assembly 204 that interfaces with the fluid inlet 216 at the inner surface 208a of the suction end 208. The valve seat insert 220 may include a ring that surrounds the fluid inlet 216, or the inner surface 208a may be configured to define a valve seat (e.g., the valve seat may be integral with the inner surface 208a). The valve 222 is configured to sealingly engage an opening in the valve seat insert 220. For example, the valve 222, in a closed position, may sealingly engage the valve seat insert 220 at the opening in the valve seat insert 220, thereby stopping fluid flow through the fluid inlet 216 and the valve seat 220. In an open position, the valve 222 may disengage the valve seat insert 220 to allow fluid flow through the fluid inlet 216 and the valve seat insert 220. In some implementations, the opening in the valve seat insert 220 may be tapered inwardly, and the valve 222 may have a corresponding taper, thereby improving a seal between the valve 222 and the valve seat insert 220. The valve 222 may be composed of a rigid material, such as a metal (e.g., steel or a steel alloy). In some implementations, the valve 222 may include an elastomeric insert 222a, extending circumferentially around the valve 222, and configured to engage the valve seat insert 220, thereby improving a seal between the valve 222 and the valve seat insert 220.

The biasing element 224 (e.g., one or more springs, one or more elastomeric bands, or the like) is configured to bias the valve 222 to a closed position with respect to the valve seat insert 220 (e.g., to prevent fluid flow through the opening in the valve seat insert 220). For example, the biasing element 224 may include a spring that is engaged with the valve 222 to bias the valve 222 to a closed position against the valve seat insert 220. The retainer element 226 (e.g., a spring retainer) is configured to engage the biasing element 224. In particular, the retainer element 226 may engage and oppose the biasing element 224 to facilitate biasing of the valve 222 by the biasing element 224. For example, during opening of the valve 222, a spring of the biasing element 224 may be compressed between the valve 222 (e.g., a first surface of the valve 222 that is opposite a second surface of the valve 222 that engages the valve seat insert 220) and the retainer element 226.

The cartridge body 202 may have a groove 228 defined in an inner surface of the sidewall 212. For example, the groove 228 may be defined in one or more of the plurality of pillars of the sidewall 212. As an example, the groove 228 may extend circumferentially around the inner surface of the sidewall 212 (e.g., with discontinuities in the groove 228 due to the openings 214). The groove 228 may have a lobe-shaped cross section. The retainer element 226 of the suction valve assembly 204 may be engaged with (e.g., seated in) the groove 228. For example, the retainer element 226 may include a retention projection 230 that is configured to engage with the biasing element 224 of the suction valve assembly 204. The retention projection 230 may project from a body portion 232 of the retainer element 226. The body portion 232 may include a planar element extending between opposing sides of the sidewall 212. The planar element may have bends such that distal ends of the planar element extend at an angle relative to a plane defined by the planar element, to facilitate engagement of the distal ends of the planar element with the groove 228. For example, the groove 228 may define a ledge, and the distal ends of the planar element may catch on the ledge to secure the retainer element 226 (e.g., to oppose pushing of the retainer element 226 by the biasing element 224). In one example, the groove 228, the retainer element 226, or both may have one or more geometric features that retain the retainer element 226 in the groove 228 (e.g., the geometric feature(s) help to prevent the retainer element 226 from coming out of the groove 228).

The discharge valve assembly 206 of the valve cartridge 200 may include a valve seat 234, a valve 236, and a biasing element 238, which may be configured similarly to the corresponding components of the suction valve assembly 204, described above. The discharge valve assembly 206 may be partially disposed inside the cartridge body 202, such that at least a portion of the discharge valve assembly 206 (e.g., the biasing element 238 and a portion of the valve 236) extends outside the cartridge body 202. The discharge valve assembly 206 may interface with the fluid outlet 218 at the outer surface 210b of the discharge end 210. Thus, the discharge valve assembly 206 may be configured to control fluid flow through the fluid outlet 218.

The valve seat 234 is the component of the discharge valve assembly 206 that interfaces with the fluid outlet 218 at the outer surface 210b of the discharge end 210. The valve 236 is configured to sealingly engage an opening in the valve seat 234. For example, the valve 236, in a closed position, may sealingly engage the valve seat 234 at the opening in the valve seat 234, thereby stopping fluid flow through the fluid outlet 218 and the valve seat 234. In an open position, the valve 236 may disengage the valve seat 234 to allow fluid flow through the fluid outlet 218 and the valve seat 234.

The biasing element 238 is configured to bias the valve 236 to a closed position with respect to the valve seat 234 (e.g., to prevent fluid flow through the opening in the valve seat 234). For example, the biasing element 238 may include a spring that is engaged with the valve 236 to bias the valve 236 to a closed position against the valve seat 234. The retainer element 142, described above, may engage the biasing element 238. In particular, the retainer element 142 may engage and oppose the biasing element 238 to facilitate biasing of the valve 236 by the biasing element 238. For example, during opening of the valve 236, a spring of the biasing element 238 may be compressed between the valve 236 (e.g., a first surface of the valve 236 that is opposite a second surface of the valve 236 that engages the valve seat 234) and the retainer element 142.

As described above, the retainer element 142 may be a component of the fluid end 102 that is disposed in the bore 108 (e.g., the retainer element 142 may be external to the valve cartridge 200). In some implementations, the discharge valve assembly 206 of the valve cartridge 200 may include the retainer element 142. For example, the retainer element 142 (e.g., which may be configured similarly to the retainer element 226) may be secured to an inner surface of the sidewall 212, in a similar manner as described above. Here, the sidewall 212 may extend past the discharge end 210 to surround the retainer element 142. In some implementations, the description of the valve cartridge 200 herein may be reversed as to the suction valve assembly 204 and the discharge valve assembly 206. For example, the discharge valve assembly 206 may include the retainer element 226 and the retainer element 142 may engage the biasing element 224 of the suction valve assembly 204.

The cartridge body 202 may have one or more grooves 240 extending circumferentially around an outer surface of the cartridge body 202. A sealing element 242 (e.g., an elastomeric gasket) may be disposed in each of the grooves 240 to promote a fluid-tight seal of the bore 108. In some implementations, the cartridge body 202 may include a first groove 240 located on the cartridge body 202 such that, when the valve cartridge 200 is installed in the bore 108, the sealing element 242 of the first groove 240 provides a fluid-tight seal between the fluid inlet 110 and the fluid chamber of the bore 108. Furthermore, the cartridge body 202 may include a second groove 240 located on the cartridge body 202 such that, when the valve cartridge 200 is installed in the bore 108, the sealing element 242 of the second groove 240 provides a fluid-tight seal between the fluid chamber and the fluid outlet 112 of the bore 108.

As indicated above, FIG. 4 is provided as an example. Other examples may differ from what is described with regard to FIG. 4.

Figure 5:
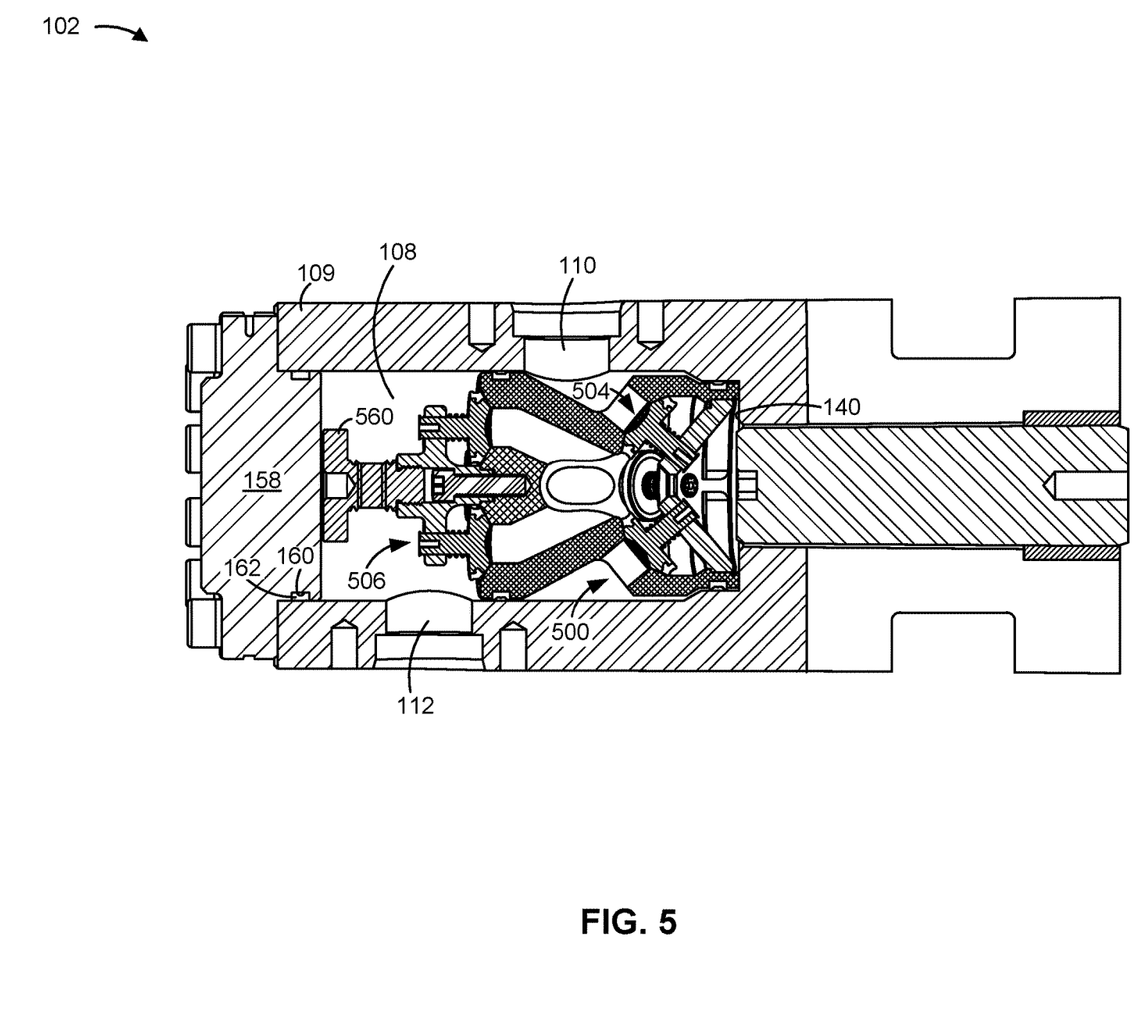
FIG. 5 is a sectional view of an example of a fluid end of the fluid pump of FIG. 1.

FIG. 5 is a sectional view of an example of the fluid end 102 of the fluid pump 100. The example of FIG. 5 is an alternative to the example of FIG. 2. The example fluid end 102 of FIG. 5 may include a valve cartridge 500 that is removably disposed in the bore 108. The valve cartridge 500 may correspond to the valve cartridge 190, described herein. For example, a suction valve assembly 504 and a discharge valve assembly 506 of the valve cartridge 500 may correspond to the suction valve assembly 192 and the discharge valve assembly 194, respectively, of the valve cartridge 190, described herein.

As shown, the bore 108 may have a first end (e.g., associated with the fluid outlet 112) and a second end (e.g., associated with the fluid inlet 110) opposite the first end, in a similar manner as described in connection with FIG. 2. The fluid inlet 110 and the fluid outlet 112 may be located in a lateral section of the bore 108 between the first end and the second end. Moreover, the bore 108 may be configured in a similar manner to that described in connection with FIG. 2. For example, the configuration of the bore 108 allows the valve cartridge 500 to be inserted into the bore 108, or removed from the bore 108, only from the second end of the bore 108 (e.g., thereby forcing proper orientation of the valve cartridge 500 in the bore 108).

In some implementations, the valve cartridge 500 may include a handle 560. The handle 560 facilitates insertion and removal of the valve cartridge 500 into and from the bore 108. The handle 560 may be attached (e.g., via a threaded connection) to the discharge valve assembly 506 (e.g., to a retainer element of the discharge valve assembly 506) or to another component of the valve cartridge 500.

The fluid end 102 may include a cap 158, in a similar manner as described in connection with FIG. 2. For example, the cap 158 may be secured to the housing 109 of the fluid end 102 (e.g., via one or more fasteners) to enclose the bore 108. The cap 158 may have a groove 160 extending circumferentially around the cap 158. A sealing element 162 (e.g., an elastomeric gasket) may be disposed in the groove 160 to promote a fluid-tight seal of the bore 108. In a similar manner as described in connection with FIG. 2, the cap 158 may be removed from the bore 108 (e.g., via the second end of the bore 108) to provide access to the valve cartridge 500. Thus, with the cap 158 removed from the bore 108, the valve cartridge 500 may be removed (e.g., using the handle 560) from the fluid end 102, as a unit (e.g., components of the suction valve assembly 504 and of the discharge valve assembly 506 are removed together as a unit), to facilitate repair or replacement of the valve cartridge 500. Similarly, a replacement, or a repaired, valve cartridge 500 may be inserted (e.g., using the handle 560) into the bore 108 and the cap 158 may be replaced.

When the valve cartridge 500 is installed in the bore 108, and the cap 158 is fully secured to the housing 109, a small gap may be present between the cap 158 and the handle 560. The gap ensures that the cap 158 is fully seated and secured when pressure is applied to the cap 158. A pressure in the bore 108 between the cap 158 and the valve cartridge 500 may force the valve cartridge 500 against the floor 140 of the housing 109, thereby fixing the valve cartridge 500 in place.

As indicated above, FIG. 5 is provided as an example. Other examples may differ from what is described with regard to FIG. 5.

Figure 6:
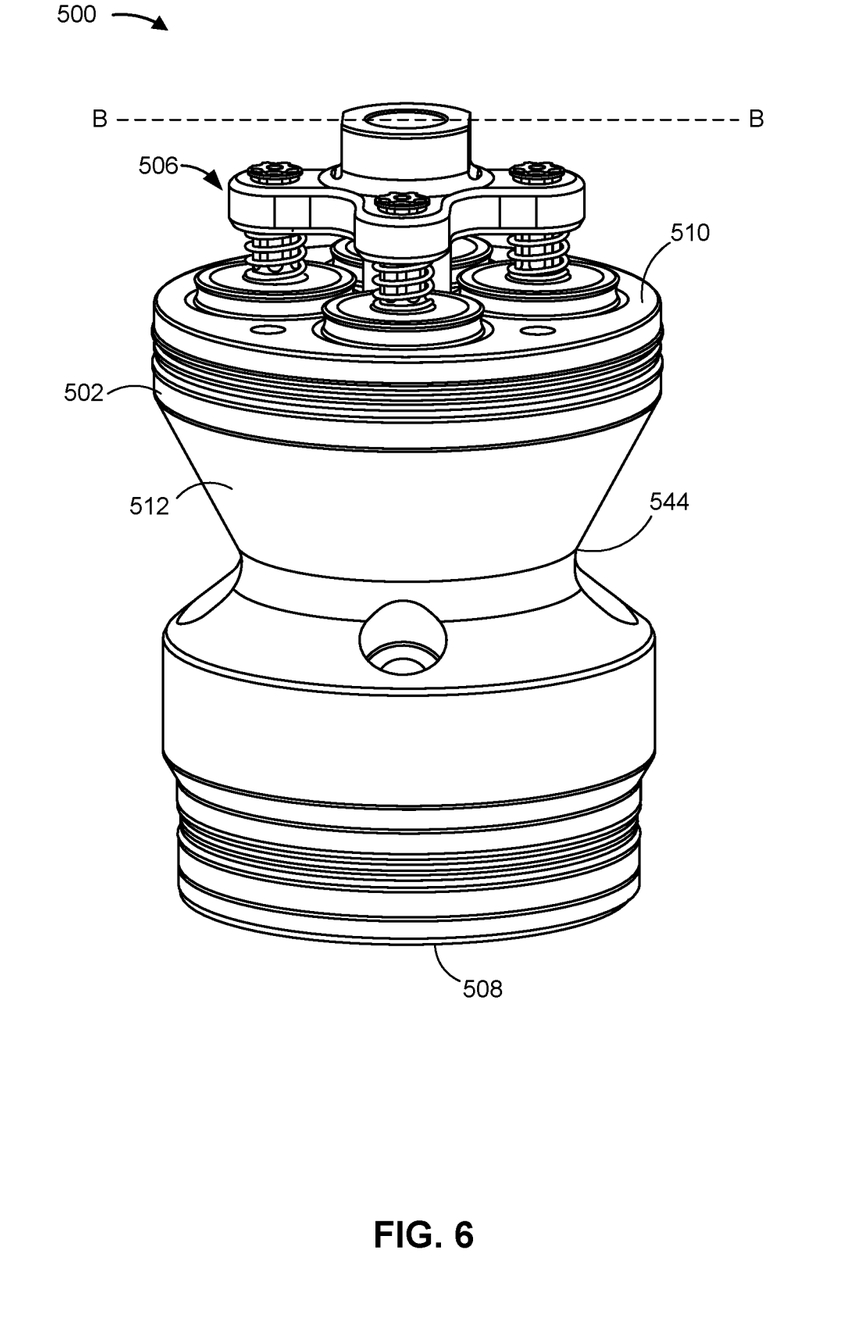
FIG. 6 is a perspective view of an example valve cartridge.

FIG. 6 is a perspective view of an example valve cartridge 500. The valve cartridge 500 includes a cartridge body 502 to which the suction valve assembly 504 and the discharge valve assembly 506 are attached. The cartridge body 502 defines a first end 508 (referred to herein as a "suction end"), a second end 510 (referred to herein as a "discharge end") opposite the suction end 508, and a sidewall 512 extending between the suction end 508 and the discharge end 510. The cartridge body may define a waist 544 (e.g., of the sidewall 512) between the first end 508 and the second end 510. The waist 544 may enable fluid flowing through the fluid inlet 110 to flow around the valve cartridge 500, when the valve cartridge 500 is installed in the bore 108. The cartridge body 502 may be composed of a rigid material, such as a metal (e.g., steel or a steel alloy).

The cartridge body 502 may have a widest section nearer to the discharge end 510 than to the suction end 508, so as to correspond to the width variations of the bore 108. For example, the cartridge body 502 may narrow in width from the discharge end 510 to the suction end 508. In this way, the configuration of the cartridge body 502 forces a proper orientation of the valve cartridge 500 when inserted in the bore 108.

As indicated above, FIG. 6 is provided as an example. Other examples may differ from what is described with regard to FIG. 6.

Figure 7:
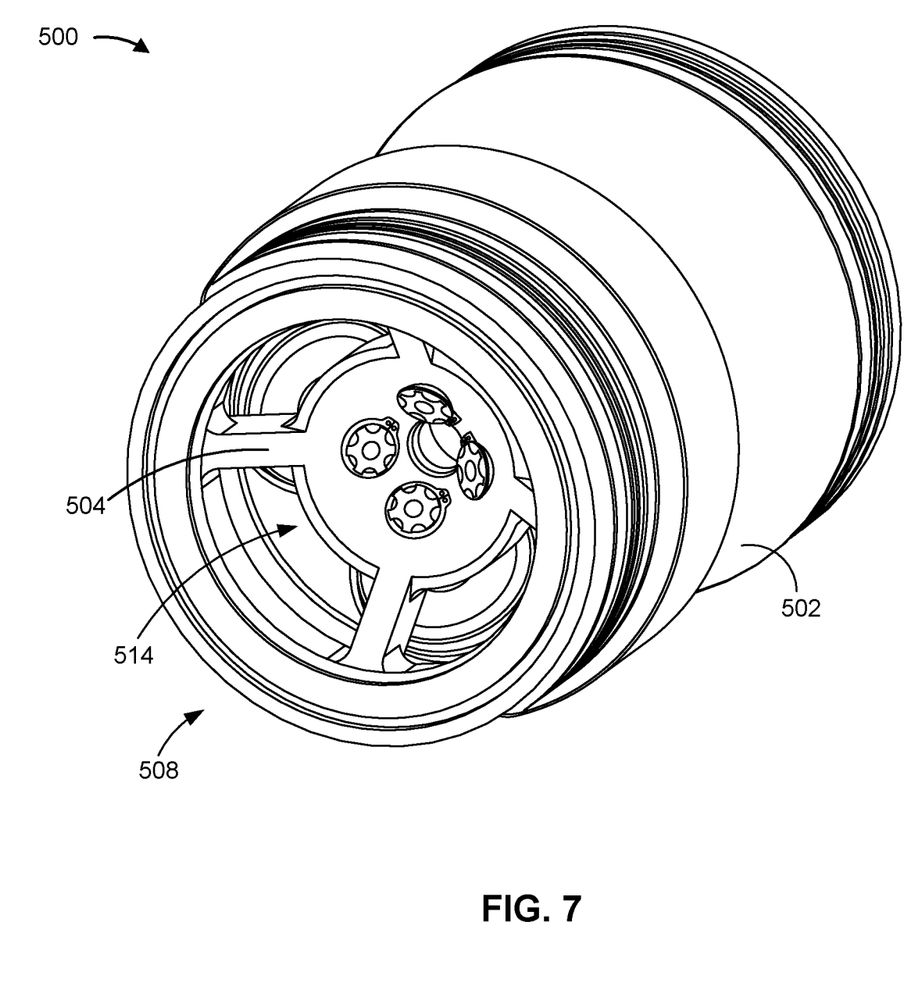
FIG. 7 is a perspective view of a valve cartridge.

FIG. 7 is a perspective view of the valve cartridge 500. As shown, the suction end 508 of the cartridge body 502 may have an opening 514. The opening 514 is configured to fluidly couple the valve cartridge 500 with the plunger 120 (e.g., the opening 514 fluidly couples the fluid chamber of the bore 108 with the suction valve assembly 504 and the discharge valve assembly 506). The opening 514 leads to a chamber defined in the cartridge body 502.

As indicated above, FIG. 7 is provided as an example. Other examples may differ from what is described with regard to FIG. 7.

Figure 8:
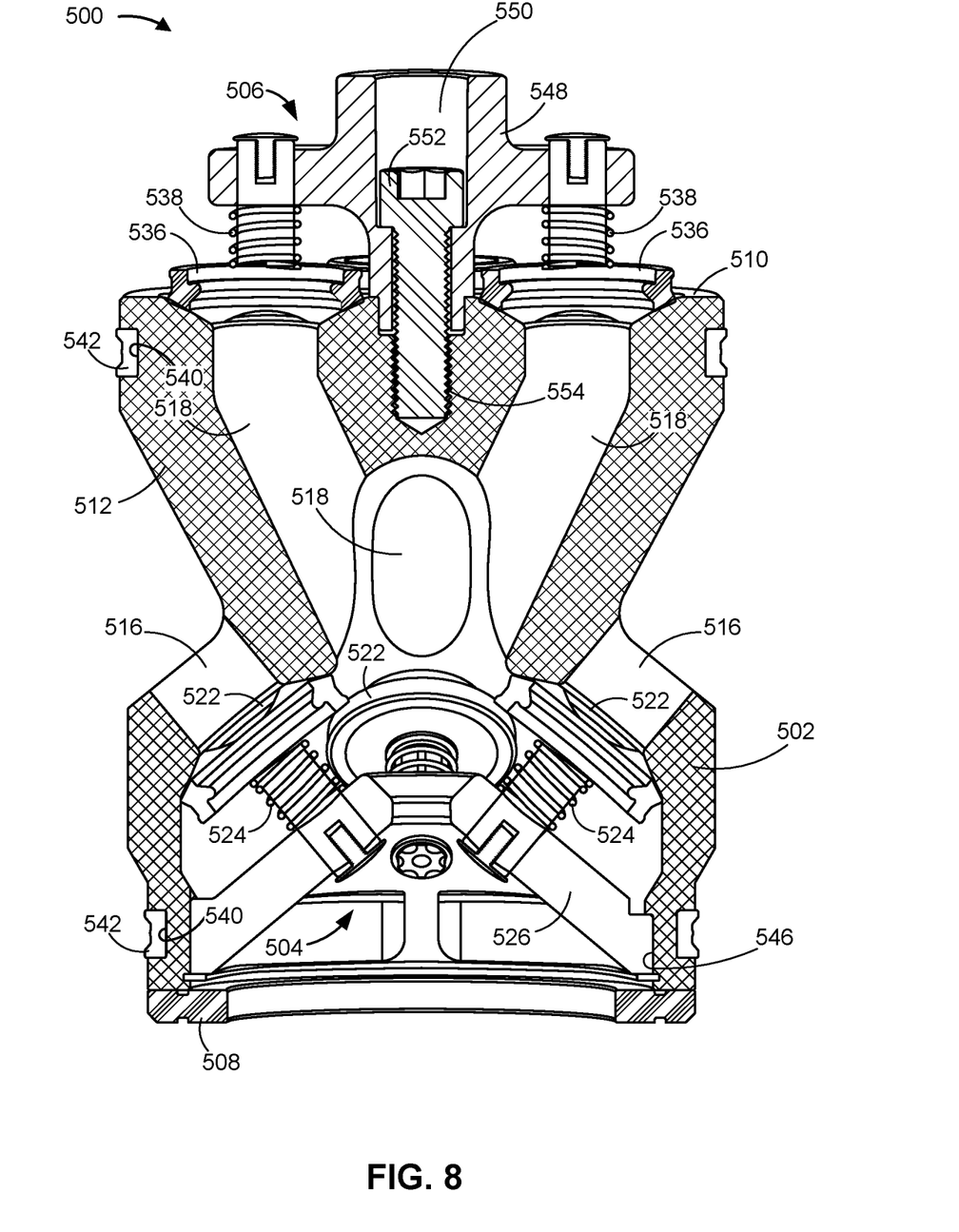
FIG. 8 is a cross-sectional view of the valve cartridge of FIG. 6 taken along line B-B.

FIG. 8 is a cross-sectional view of the valve cartridge 500 of FIG. 6 taken along line B-B. The cartridge body 502 may have a fluid inlet 516 and a fluid outlet 518. The fluid inlet 516 may be in fluid communication with the fluid outlet 518 via the chamber in the cartridge body 502. For example, the fluid inlet 516 may be a passageway leading into the chamber and the fluid outlet 518 may be a passageway leading out from the chamber. As an example, the fluid inlet 516 may be a passageway (e.g., a bore) through the sidewall 512 of the cartridge body 502 (e.g., leading into the chamber), and the fluid outlet 518 may be a passageway defined in the cartridge body 502 that extends through the discharge end 510 of the cartridge body 502. When the valve cartridge 500 is installed in the bore 108, the fluid inlet 516 may be in fluid communication with the fluid inlet 110 (e.g., via void space in the bore 108). Similarly, when the valve cartridge 500 is installed in the bore 108, the fluid outlet 518 may be in fluid communication with the fluid outlet 112 (e.g., via void space in the bore 108).

The suction valve assembly 504 of the valve cartridge 500 may include a valve 522, a biasing element 524, and a retainer element 526, which may be configured in a similar manner as described in connection with FIG. 4 (e.g., the valve 522 is configured to sealingly engage the fluid inlet 516, the biasing element 524 is configured to bias the valve 522 to a closed position with respect to the fluid inlet 516, and the retainer element 526 is configured to engage the biasing element 524). The suction valve assembly 504 may be disposed inside the cartridge body 502 (e.g., the suction valve assembly 504 may be disposed in the chamber of the cartridge body 502). The suction valve assembly 504 may interface with the fluid inlet 516 at the inner surface of the chamber of the cartridge body 502. Thus, the suction valve assembly 504 may be configured to control fluid flow through the fluid inlet 516.

In some implementations, the suction valve assembly 504 may include a valve seat insert, in a similar manner as described in connection with FIG. 4. In some examples, the suction valve assembly 504 may omit a valve seat insert. Here, a plug portion of the valve 522 may have a chamfer configured to seat into a corresponding chamfer, in the cartridge body 502 (e.g., at the inner surface of the chamber), surrounding the fluid inlet 516.

The retainer element 526 may be disposed inside the cartridge body 502 (e.g., in the chamber of the cartridge body 502). The retainer element 526 may be engaged with an inner surface of the cartridge body 502 (e.g., the inner surface of the chamber of the cartridge body 502). For example, the inner surface of the cartridge body 502 may include a groove 546, and the retainer element 526 may be engaged with (e.g., seated in) the groove 546, thereby securing the retainer element 526 (e.g., to oppose pushing of the retainer element 526 by the biasing element 524). In one example, the retainer element 526 may include an outer ring configured to engage the groove 546, an inner hub configured to engage the valve 522 and the biasing element 524, and one or more spokes connecting the outer ring and the inner hub (e.g., as shown in FIG. 7).

In some implementations, the fluid inlet 516 may be one of a plurality of fluid inlets 516. The suction valve assembly 504 may include a plurality of valves 522 (e.g., that are configured in parallel) to control fluid flow through respective fluid inlets 516 (e.g., such that opening of any one of the valves 522 may cause fluid to flow through the corresponding fluid inlet 516). Moreover, the suction valve assembly 504 may include a plurality of biasing elements 524 configured to bias respective valves 522 to a closed position. Alternatively, a single biasing element 524 may be configured to bias all of the valves 522 to a closed position. In some examples, the retainer element 526 may be common to the plurality of valves 522 and the plurality of biasing elements 524 (e.g., the suction valve assembly 504 may include only a single retainer element 526). Alternatively, multiple retainer elements 526 may engage respective sets of biasing elements 524 and valves 522.

In some examples, the valves 522 may be angled with respect to a longitudinal axis of the cartridge body 502 (e.g., an axis extending through the suction end 508 and the discharge end 510 of the cartridge body 502). Furthermore, the fluid inlets 516 may be angled in alignment with respective valves 522. Angling the valves 522 reduces an overall size of the suction valve assembly 504 to enable the suction valve assembly 504 to fit in the cartridge body 502. The retainer element 526 (e.g., that is common to the plurality of valves 522) may be conically shaped to accommodate the angling of the valves 522. For example, a stem portion of an angled valve 522 may extend perpendicularly through the conical retainer element 526.

The discharge valve assembly 506 of the valve cartridge 500 may include a valve 536, a biasing element 538, and a retainer element 548, which may be configured similarly to the corresponding components of the suction valve assembly 504 described above (e.g., the valve 536 is configured to sealingly engage the fluid outlet 518, the biasing element 538 is configured to bias the valve 536 to a closed position with respect to the fluid outlet 518, and the retainer element 548 is configured to engage the biasing element 538). The discharge valve assembly 506 may be partially disposed inside the cartridge body 502, such that at least a portion of the discharge valve assembly 506 extends outside the cartridge body 502. The discharge valve assembly 506 may interface with the fluid outlet 518 at an outer surface of the cartridge body 502. Thus, the discharge valve assembly 506 may be configured to control fluid flow through the fluid outlet 518.

In some implementations, the discharge valve assembly 506 may include a valve seat insert, in a similar manner as described in connection with FIG. 4. In some examples, the discharge valve assembly 506 may omit a valve seat insert. Here, a plug portion of the valve 536 may have a chamfer configured to seat into a corresponding chamfer, in the cartridge body 502 (e.g., at the outer surface of the cartridge body 502), surrounding the fluid outlet 518.

The retainer element 548 may be connected to an outer surface of the cartridge body 502. For example, the retainer element 548 may have a bore 550 (e.g., a threaded bore) configured to receive a fastener 552 (e.g., a bolt) that extends into a socket 554 (e.g., a threaded socket) in the cartridge body 502, thereby securing the retainer element 548 (e.g., to oppose pushing of the retainer element 548 by the biasing element 538). In another example, the retainer element 548 may be assembled into a groove in the cartridge body 502 (e.g., in a similar manner as described in connection with the retainer element 526).

In some implementations, the fluid outlet 518 may be one of a plurality of fluid outlets 518. The plurality of fluid outlets 518 (e.g., passageways through the cartridge body 502) may converge at the chamber of the cartridge body 502. For example, a fluid outlet 518 may include a bend to angle the fluid outlet 518 toward a point where the fluid outlets 518 converge. The discharge valve assembly 506 may include a plurality of valves 536 (e.g., that are configured in parallel) to control fluid flow through respective fluid outlets 518 (e.g., such that opening of any one of the valves 536 may cause fluid to flow through the corresponding fluid outlet 518). The discharge valve assembly 506 may include a plurality of biasing elements 538 to bias respective valves 536 to a closed position, or a single biasing element 538 to bias all valves 536 to a closed position, in a similar manner as described in connection with the suction valve assembly 504. The retainer element 548 may be common to the plurality of valves 536 and the plurality of biasing elements 538, or multiple retainer elements 548 may engage respective sets of biasing elements 538 and valves 536, in a similar manner as described in connection with the suction valve assembly 504. In one example, the retainer element 548 may include a central hub (e.g., that includes the bore 550), and multiple arms extending from the central hub configured to engage respective sets of biasing elements 538 and valves 536 (as shown in FIG. 6).

The cartridge body 502 may have one or more grooves 540 extending circumferentially around an outer surface of the cartridge body 502, and a sealing element 542 may be disposed in each of the grooves 540 to promote a fluid-tight seal of the bore 108, in a similar manner as described in connection with FIG. 4.

As indicated above, FIG. 8 is provided as an example. Other examples may differ from what is described with regard to FIG. 8.

INDUSTRIAL APPLICABILITY

The valve cartridge described herein may be used with any positive displacement fluid pump (e.g., a reciprocating positive displacement fluid pump). For example, a fluid pump, such as a hydraulic fracturing pump, having a power end and a fluid end may use the valve cartridge, described herein, in the fluid end. A fluid pump (e.g., a fluid end of the fluid pump) has a suction side, at which low-pressure fluid enters the fluid pump via a suction valve assembly to be pressurized, and a discharge side at which high-pressure fluid pressurized by the fluid pump exits the fluid pump via a discharge valve assembly. As described herein, a valve assembly may include various components, such as a valve, a valve seat, a spring, a spring retainer, or the like, and each of these components are subject to wear and/or failure. Generally, to service the suction and discharge valve assemblies of the fluid pump, the suction and discharge valve assemblies may be disassembled and removed from the fluid pump, sometimes using specialized equipment, and then reassembled in the fluid pump following servicing. Accordingly, servicing the suction and discharge valve assemblies of the fluid pump can be time consuming and inefficient.

The valve cartridge described herein may include both a suction valve assembly and a discharge valve assembly in a unitary part. In particular, the valve cartridge may be inserted into, or removed from, a fluid pump as a unit. When the valve cartridge is inserted into the fluid pump, the suction valve assembly and the discharge valve assembly are appropriately positioned to provide control over low-pressure fluid entering the fluid pump and high-pressure fluid exiting the fluid pump. Thus, the valve cartridge facilitates plug-and-play installation of the suction valve assembly and the discharge valve assembly in the fluid pump. After a useful life of the suction valve assembly and the discharge valve assembly, the valve cartridge may be removed from the fluid pump and replaced with a new valve cartridge. Accordingly, the valve cartridge enables fast and efficient servicing of the suction valve assembly and the discharge valve assembly.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the"

is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A valve cartridge for a fluid pump, comprising:
a cartridge body defining a first end, a second end opposite the first end, and a sidewall extending between the first end and the second end,
the cartridge body having a plurality of fluid inlets through the sidewall and a plurality of fluid outlets;
a first valve assembly configured to control fluid flow through the plurality of fluid inlets,
the first valve assembly disposed inside the cartridge body, and
the first valve assembly comprising:
a first retainer element engaged with an inner surface of the cartridge body,
a plurality of first valves engaged by the first retainer element, and
a plurality of first biasing elements, to bias the plurality of first valves to a closed position, engaged by the first retainer element; and
a second valve assembly configured to control fluid flow through the plurality of fluid outlets,
the second valve assembly comprising:
a second retainer element connected to an outer surface of the cartridge body,
a plurality of second valves engaged by the second retainer element, and
a plurality of second biasing elements, to bias the plurality of second valves to a closed position, engaged by the second retainer element,
the valve cartridge configured for insertion into, and removal from, a cartridge bore in a housing of the fluid pump as a unit.

2. The valve cartridge of claim 1,
wherein the second valve assembly is interfaced with the plurality of fluid outlets at an outer surface of the second end.

3. The valve cartridge of claim 1, wherein the cartridge body has a groove in an inner surface of the sidewall, and
wherein the first retainer element is engaged with the groove.

4. The valve cartridge of claim 1, wherein the cartridge body defines a waist in the sidewall between the first end and the second end.

5. The valve cartridge of claim 4, wherein the plurality of fluid inlets are on the waist.

6. The valve cartridge of claim 1, wherein the first end has an opening configured to fluidly couple the valve cartridge with a plunger of the fluid pump, and
wherein the plurality of fluid outlets extend through the second end.

7. The valve cartridge of claim 1, wherein a widest section of the cartridge body is nearer to the second end than to the first end.

8. The valve cartridge of claim 1, wherein the first retainer element comprises:
an outer ring engaged with the inner surface of the cartridge body;
an inner hub engaging the plurality of first valves and the plurality of first biasing elements; and
one or more spokes connecting the outer ring and the inner hub.

9. A valve cartridge for a fluid pump, comprising:
a cartridge body defining a first end, a second end opposite the first end, and a sidewall extending between the first end and the second end,
the cartridge body defining a waist in the sidewall between the first end and the second, and
the cartridge body having a plurality of fluid inlets through the sidewall on the waist and a plurality of fluid outlets;
a first valve assembly configured to control fluid flow through the plurality of fluid inlets, the first valve assembly comprising:
a plurality of first valves; and
a plurality of first biasing elements to bias the plurality of first valves to a closed position; and
a second valve assembly configured to control fluid flow through the plurality of fluid outlets, the second valve assembly comprising:
a plurality of second valves; and
a plurality of second biasing elements to bias the plurality of second valves to a closed position,
the valve cartridge configured for insertion into, and removal from, a cartridge bore in a housing of the fluid pump as a unit.

10. The valve cartridge of claim 9, wherein the first valve assembly further comprises:
a first retainer element configured to engage the plurality of first biasing elements, and
wherein the second valve assembly further comprises:
a second retainer element configured to engage the plurality of second biasing elements.

11. The valve cartridge of claim 9,
wherein the plurality of first valves control fluid flow through respective fluid inlets of the plurality of fluid inlets, and
wherein the plurality of second valves control fluid flow through respective fluid outlets of the plurality of fluid outlets.

12. The valve cartridge of claim 9, wherein the plurality of first valves are angled with respect to a longitudinal axis of the cartridge body.

13. The valve cartridge of claim 12, wherein the first valve assembly further comprises a retainer element, common to the plurality of first valves, that is conically shaped.

14. The valve cartridge of claim 9, wherein the second valve assembly further comprises a retainer element, common to the plurality of second valves and the plurality of second biasing elements, connected to an outer surface of the cartridge body.

15. A fluid pump, comprising:
a power end;
a fluid end having a cartridge bore and a plunger; and
a valve cartridge configured for insertion into, and removal from, the cartridge bore as a unit, the valve cartridge comprising:
a cartridge body defining a first end, a second end opposite the first end, and a sidewall extending between the first end and the second end,
the first end having an opening configured to fluidly couple the valve cartridge with the plunger, and
the cartridge body having a plurality of fluid inlets through the sidewall and a plurality of fluid outlets;

a first valve assembly configured to control fluid flow through the plurality of fluid inlets, the first valve assembly comprising a plurality of first valves; and a second valve assembly configured to control fluid flow through the plurality of fluid outlets, the second valve assembly comprising a plurality of second valves.

16. The fluid pump of claim 15, further comprising:

a retainer element disposed in the cartridge bore and configured to engage with a plurality of biasing elements of the second valve assembly.

17. The fluid pump of claim 15, wherein the plurality of fluid outlets extend through the second end.

18. The fluid pump of claim 15, wherein the opening is to a chamber defined in the cartridge body, and wherein the first valve assembly is disposed in the chamber.

19. The fluid pump of claim 15, wherein the plurality of first valves control fluid flow through respective fluid inlets of the plurality of fluid inlets, and wherein the plurality of second valves control fluid flow through respective fluid outlets of the plurality of fluid outlets.

20. The fluid pump of claim 15, wherein the cartridge body defines a waist in the sidewall between the first end and the second end.

* * * * *